United States Patent Office 2,885,361
Patented May 5, 1959

2,885,361

LUBRICANT COMPOSITIONS

Ellis K. Fields, Chicago, Ill., assignor to Standard Oil Company, Chicago, Ill., a corporation of Indiana No Drawing. Application October 31, 1955
Serial No. 544,087

8 Claims. (Cl. 252—32.7)

This invention relates to improved lubricating oil compositions and in particular it pertains to compositions containing a detergent-type additive having improved rust proofing properties.

Many oils are not well suited as lubricants for use in internal combustion engines, particularly of the type operating under severe conditions, since under such conditions the lubricants are susceptible to deterioration resulting in the development of carbonaceous and/or resinous or similar varnish-like deposits in the engines and on and about the valves and rings of the engine.

It has heretofore been found that certain reaction products of a phosphorus sulfide and a hydrocarbon, particularly an olefin or an olefin polymer, when added in small amounts to a hydrocarbon oil, are effective in inhibiting the formation of varnish, sludge, carbon and the like in lubricating oils during use. It has also been found that neutralizing these reaction products of a phosphorus sulfide and a hydrocarbon with a basic reagent having a metal constituent provides a composition which is effective as a detergent.

However, it has been found that under certain conditions lubricants containing the neutralized, metal-containing reaction product of a phosphorus sulfide and a hydrocarbon do not effectively inhibit the formation of rust and the like on metal surfaces which are being lubricated. It is an object of the present invention to provide a lubricant for internal combustion engines which will inhibit such rust formation. It is a further object of the invention to provide a lubricant additive which also serves the functions of (1) inhibiting the oxidative deterioration of the lubricant, (2) preventing corrosion of the lubricated surfaces and (3) acting as a detergent to prevent ring sticking, varnishing or coating of the metallic surfaces of internal combustion engines, as well as a suspending or dispersing agent for dispersing very small particles of deterioration products or contaminating materials in the oil. These and additional objects will become apparent as the description of the invention proceeds.

It has been discovered that a product having the desired detergency characteristics as well as improved rust proofing properties can be obtained by incorporating in a lubricating oil base between about 0.001 and 20% by weight of an additive which is prepared by neutralizing a mixture of an amino carboxylic acid and a phosphorus sulfide-hydrocarbon reaction product with a basic reagent containing a metal constituent. The mixture which is neutralized may contain between 0.5 and 20 parts, e.g. 5 parts, of the amino carboxylic acid per 100 parts by weight of the phosphorus sulfide-hydrocarbon reaction product. Examples of preferred amino carboxylic acids are iminodiacetic acid and ethylenediamine tetraacetic acid. The phosphorus sulfide-hydrocarbon reaction product is preferably a phosphorus sulfide-butylene polymer reaction product. The basic reagent employed in neutralizing the mixture is preferably one containing an alkaline earth metal constituent such as barium.

In preparing the additive, an amino carboxylic acid which may have between 2 and 40 carbon atoms, between 1 and 7 amino nitrogen atoms, and between 1 and 14 carboxylic acid groups is used. The preferred amino carboxylic acids have approximately 2 carboxylic acid groups per amino nitrogen atom. Either the aliphatic or the cyclic type of amino carboxylic acid may be used, the lower cost of the former dictating an economic preference for it. Examples of the various amino carboxylic acids which may be employed are aminoacetic acid, iminodiacetic acid, α-aminopropionic acid, β-aminopropionic acid, aminosuccinic acid, α-aminoglutaric acid, α-aminoisocaproic acid, α-amino-β-phenylpropionic acid, 2-pyrrolidine carboxylic acid, β-hydroxyalanine, N-(p-hydroxyphenyl) glycine, creatine, ethylenediamine tetraacetic acid, triethylene tetra-amine hexa-acetic acid, and the like. Iminodiacetic acid and ethylenediamine tetraacetic acid are examples of two preferred amino carboxylic acids.

The phosphorus sulfide-hydrocarbon reaction product which is employed is the reaction product of any of a variety of phosphorus-sulfur compounds with any of a variety of hydrocarbons. The preferred hydrocarbon used for reaction with the phosphorus sulfide is a mono-olefin hydrocarbon polymer resulting from the polymerization of low molecular weight mono-olefin hydrocarbons, such as propylene, butylenes, amylenes or copolymers thereof. Such polymers may be obtained by the polymerization of mono-olefins of less than 6 carbon atoms in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and iso-mono-olefin polymers having molecular weights ranging from about 150 to about 50,000 or more, and preferably from about 500 to about 10,000. Such polymers can be obtained, for example, by the polymerization in the liquid phase of a hydrocarbon mixture containing mono- and isomono-olefins, such as butylene and isobutylene at a temperature of from about —80° F. to about 100° F. in the presence of a metal halide catalyst of the Friedel-Crafts type, such as for example, boron fluoride, aluminum chloride, and the like. In the preparation of these polymers, a hydrocarbon mixture containing isobutylene, butylenes and butanes recovered from petroleum gases, especially those gases produced in the cracking of petroleum oils in the manufacture of gasoline can be used.

Paraffinic hydrocarbons such as bright stock residuums, lubricating oil distillates, waxes, and the like can be reacted with phosphorus sulfide. Olefins having 16 to 30 carbon atoms or higher may be reacted with the phosphorus sulfide. Other hydrocarbons that can be reacted with a phosphorus sulfide are aromatic hydrocarbons such as benzene, naphthalene, diphenyl, alkylated aromatic hydrocarbons such as benzene having alkyl substituents containing preferably at least 8 carbon atoms, and the like.

The phosphorus sulfide-hydrocarbon reaction product can be readily obtained by reacting a phosphorus sulfide, for example $P_2S_5$ with the hydrocarbon at a temperature of from about 200° F. to about 500° F., and preferably from about 200° F. to about 400° F., using from about 1% to about 50%, and preferably from about 5% to about 25% of the phosphorus sulfide in the reaction. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon so that no further purification becomes necessary; however, an excess amount of phosphorus sulfide can be used and separated from the product by filtration or by dilution with a hydrocarbon solvent, such as hexane, filtering and subsequently removing the solvent by suitable means, such as by distillation. The reaction product is preferably further treated with steam at an elevated temperature of from about 100° F. to about 600° F. for ½ to 8 hours or thereabouts, preferably followed by claying to remove inorganic acids of phosphorus.

The phosphorus sulfide-hydrocarbon reaction product normally shows a titratable acidity, as does the amino carboxylic acid. The mixture of the amino carboxylic acid and the phosphorus sulfide-hydrocarbon reaction product are neutralized with the basic reagent which contains a metal constituent. The mixture which is subjected to neutralization may contain between 0.5 and 20 parts of the amino carboxylic acid, usually between about 5 and 10 parts, per 100 parts by weight of the phosphorus sulfide-hydrocarbon reaction product, although larger or smaller amounts of the amino carboxylic acid may be used with satisfactory results.

In neutralizing the mixture of the amino carboxylic acid and the phosphorus sulfide-hydrocarbon reaction product, the mixture may have all of its titratable acidity neutralized by reaction with the basic reagent or it may have as little as 1% of its titratable acidity neutralized. When the mixture is neutralized with the basic reagent containing a metal constituent, it is characterized by the presence or retention of the metal constituent of the basic reagent. The additive which is made by neutralizing the mixture of the amino carboxylic acid and the phosphorus sulfide-hydrocarbon reaction product also includes those products which contain the metal constituent in excess of the amount stoichiometrically necessary to replace the acidic hydrogen atoms of the mixture neutralized. Such neutralized compounds which have this excess amount of metal constituent are known in the art as having "excess basicity." They have also been called "highly basic" as well as compounds which "have an alkaline reserve" which serves to neutralize acids formed in the oxidation of the gasoline and/or the sulfur compounds contained therein and/or the lubricating oil. It is apparent that the amount of the metal constituent which becomes incorporated in the mixture of the amino carboxylic acid and the phosphorus sulfide-hydrocarbon reaction product depends upon the extent of neutralization of the mixture. As previously stated it may be incompletely neutralized, completely neutralized, or may have excess basicity. It is preferred that the mixture be at least completely neutralized. If barium is the metal constituent of the basic reagent, then a product having "excess basicity" will ordinarily be produced when the product has between about 3 and 15 parts, e.g. about 5 parts, of barium per part by weight of phosphorus in the additive produced. If the adidtive contains between about 1 and 3 parts of barium per part by weight of phosphorus, then the additive will generally be completely neutralized.

The neutralization of the mixture of the amino carboxylic acid and the phosphorus sulfide-hydrocarbon reaction product may be carried out by treating the mixture with a basic reagent such as a hydroxide, carbonate, oxide, or sulfide of an alkali or alkaline earth metal, such as for example, potassium hydroxide, sodium hydroxide, sodium sulfide, calcium oxide, lime, barium hydroxide, barium oxide, etc. The neutralization is carried out preferably in a non-oxidizing atmosphere by contacting the mixture of the amino carboxylic acid and the phosphorus sulfide-hydrocarbon reaction as such or dissolved in a suitable solvent, such as naphtha with an aqueous or alcoholic solution of the basic reagent. As an alternative method the mixture can be treated with solid alkaline compounds such as KOH, NaOH, $Na_2CO_3$, CaO, BaO, $Ba(OH)_2$, $Na_2S$, and the like at elevated temperatures of from about 50° F. to about 600° F. The neutralization may ordinarily be accomplished at temperatures of from about 100° to about 300° F. for ½ to 6 hours or thereabouts. The volatile materials may then be removed from the neutralization products by a suitable technique such as blowing with an inert gas e.g. nitrogen, at an elevated temperature, e.g. 300° F. The neutralized products may then be filtered through clay. A neutralized mixture containing a heavy metal constituent, such as for example, tin, titanium, aluminum, chromium, cobalt, zinc, iron, and the like, can be obtained by reacting a salt of the desired heavy metal with the neutralized products obtained by treating with the basic reagent such as above described.

Rust proofing tests were used to demonstrate the effectiveness of the additives of my invention. A number of samples containing detergent additives representative of the prior art and my detergent additive which has improved rust proofing ability were evaluated. The samples had the following compositions:

*Sample 1.*—SAE 30 solvent extracted base oil containing 3.3% of a barium containing neutralized reaction product of $P_2S_5$ and a polybutene of about 1000 M.W. (having a barium to phosphorus weight ratio of approximately 3:1).

*Sample 2.*—SAE 30 solvent extracted base oil containing 3.3% of a neutralized mixture of iminodiacetic acid and a phosphorus sulfide-hydrocarbon reaction product. The phosphorus sulfide-hydrocarbon reaction product contained 2.4% P and 0.64% S, and was prepared from a polybutene of about 1000 M.W. The neutralization was carried out by stirring a mixture of 300 g. of the phosphorus sulfide-hydrocarbon reaction product with 15 g. of iminodiacetic acid and 20 cc. of methanol at 140° F. and adding 75 g. $Ba(OH)_2 \cdot H_2O$. After refluxing for thirty minutes and diluting with 240 g. of 5W oil, it was blown for one hour at 300° F. with $N_2$ and filtered through celite. The viscous additive contained 6.53% Ba, 1.41% P, and 0.12% N.

*Sample 3.*—SAE 30 solvent extracted base oil containing 3.3% of a neutralized mixture of ethylenediamine tetra-acetic acid and a phosphorus sulfide-hydrocarbon reaction product. The additive was prepared in approximately the same manner as described in Sample 2 except that the phosphorus sulfide-hydrocarbon reaction product contained 8.8% P and 6.94% S, approximately 50 g. of ethylenediamine tetra-acetic acid was used as the amino carboxylic acid, and 150 g. of $Ba(OH)_2 \cdot H_2O$ was employed. The additive produced contained 5.18% Ba, 2.45% P, and 0.10% N.

*Sample 4.*—SAE 30 solvent extracted base oil containing 5.44% of a neturalized mixture of aminoacetic acid and phosphorus sulfide-hydrocarbon reaction product. The additive was prepared in exactly the same manner as described in Sample 2 except for the use of aminoacetic acid as the amino carboxylic acid. The finished additive contained 5.16% Ba, 1.18% P, and 0.22% N.

*Sample 5.*—SAE 30 solvent extracted base oil containing 5.44% of a neutralized mixture of α-aminoglutaric acid and phosphorus sulfide-hydrocarbon reaction product. The finished additive was prepared in exactly the same manner as described for Sample 2 except that α-aminoglutaric acid was employed as the amino carboxylic acid. The finished additive contained 5.91% Ba, 1.18% P, and 0.12% N.

*Sample 6.*—SAE 30 solvent extracted base oil containing 5.44% of a neutralized mixture of creatine and phosphorus sulfide-hydrocarbon reaction product. The finished additive was prepared in exactly the same manner as described for Sample 2 except that creatine was used as the amino carboxylic acid. The finished additive contained 5.43% Ba, 1.116% P, and 0.26% N.

*Sample 7.*—SAE 30 solvent extracted base oil containing 5.44% of a neutralized mixture of N-(p-hydroxyphenyl) glycine and a phosphorus sulfide-hydrocarbon reaction product. The finished additive was prepared in exactly the same manner as described in Sample 2 except that N-(p-hydroxyphenyl) glycine was employed as the amino carboxylic acid. The finished additive contained 5.15% Ba, 1.18% P, and 0.09% N.

The above samples were tested in accordance with ASTM D-665 for determining the rust proofing characteristics of the oil in the presence of water. The test is described in detail in ASTM Standards, Part 5, pages 967–971 (1949). In addition a film tenacity test was made using the samples. This test was run after the ASTM D-665 test and is similar in all respects except that the oil used in the test is removed and replaced with water. The test provides an indication of the tenacity with which the oil film is retained on the test specimen. In the table of rust proofing tests which follows, the amount of rusting evident is indicated by slight (1 to 3 specks of rust); moderate (5 to 15 specks of rust); or severe (heavy rusting).

*Rust-proofing tests*

| Sample No. | ASTM D-665 Test, Amt. of Rust | Film Tenacity Test, Amt. of Rust |
| --- | --- | --- |
| 1 | Moderate | Severe. |
| 2 | None | None. |
| 3 | do | Do. |
| 4 | do | Slight. |
| 5 | do | Do. |
| 6 | do | Moderate. |
| 7 | do | Do. |

The detergent additive in Sample 1 did not prevent rusting of the test specimen. The detergent additive contained in Sample 1 is a typical neutralized phosphorus sulfide-hydrocarbon reaction product. The detergent additives contained in Samples 2 and 3 impart excellent rust-proofing properties to the oil. Thus the data show the importance of neutralizing a mixture of iminodiacetic acid (Sample 2) or ethylenediamine tetra-acetic acid (Sample 3) and phosphorus sulfide-hydrocarbon product with the basic reagent containing a metal constituent such as barium in order to produce an additive with excellent rust-proofing properties.

The detergency properties of the above samples were also determined in the Indiana Stirring Oxidation Test (I.S.O.T.), which test is described in S.N. 462,610, now Patent No. 2,726,208. In the tests it was found that the oil containing the additives of my invention possessed the detergency characteristics of prior art additives such as was contained in Sample 1.

Concentrates of a suitable lubricating oil base containing from about 20% to about 50% or more of the herein described additive, alone or in combination with various amounts of other additives such as bearing corrision inhibitors, viscosity index improvers, and the like, can be used for blending with other lubricating oil bases in the proportions desired for the particular conditions of use to give a finished product containing from about 0.001 to about 20% of the additive of this invention.

While the present invention has been described by the use of my composition in petroleum lubricating oils, other lubricating oil bases may be employed such as hydrocarbon oils, natural or synthetic, such as those obtained by the polymerization of olefins, as well as synthetic lubricating oils of the alkylene oxide types, and the polycarboxylic acid ester type oils such as the oil-soluble esters of adipic acid, sebacic acid, azelaic acid, etc. It is also contemplated that various other of the well known corrosion inhibitors, anti-oxidants, anti-foaming agents, pour point depressors, extreme pressure agents, anti-wear agents, V.I. improvers, etc. may be incorporated in lubricating oils containing the additive of my invention.

Unless otherwise stated, the percentages stated herein and in the claims are weight percentages.

Although the present invention has been described with reference to specific preferred embodiments thereof, the invention is not to be considered as limited thereto but includes within its scope such modifications and variations as come within the spirit of the appended claims.

I claim:

1. A lubricating oil composition comprising a major proportion of a lubricating oil base and between about 0.001 and 20% of an additive prepared by neutralizing a mixture of an oil-insoluble amino carboxylic acid and a phosphorus sulfide-hydrocarbon reaction product with at least one basic reagent selected from the group consisting of basic alkali and alkaline earth metal compounds, said mixture containing between 0.5 and 20 parts of the amino carboxylic acid per 100 parts by weight of the phosphorus sulfide-hydrocarbon reaction product.

2. The composition of claim 1 wherein said amino carboxylic acid is iminodiacetic acid.

3. The composition of claim 1 wherein said amino carboxylic acid is ethylenediamine tetra-acetic acid.

4. The composition of claim 1 wherein said phosphorus sulfide-hydrocarbon reaction product is a phosphorus sulfide-butylene polymer reaction product.

5. The composition of claim 1 wherein the basic reagent is a basic barium compound.

6. A lubricating oil composition comprising a major proportion of a lubricating oil base and between about 0.001 and 20% of an additive prepared by neutralizing a mixture of an oil-insoluble amino carboxylic acid and a phosphorus sulfide-butylene polymer reaction product with a basic barium compound said mixture containing between about 0.5 and 20 parts of the amino carboxylic acid per 100 parts by weight of the phosphorus sulfide-butylene polymer reaction product.

7. The composition of claim 6 wherein said amino carboxylic acid is iminodiacetic acid.

8. An additive composition for a lubricating oil which composition comprises a concentrated solution of a lubricating oil base containing from about 20 to about 50 percent of an additive prepared by neutralizing a mixture of an oil-insoluble amino carboxylic acid and a phosphorus sulfide-hydrocarbon reaction product with at least one basic reagent selected from the group consisting of basic alkali and alkaline earth metal compounds, said mixture of amino carboxylic acid and phosphorus sulfide-hydrocarbon reaction product containing between 0.5 and 20 parts of the amino carboxylic acid per 100 parts by weight of the phosphorus sulfide-hydrocarbon reaction product, said concentrated solution being capable of dilution with a lubricating oil base to form a homogeneous mixture containing between about 0.001 and 20 percent of the neutralized mixture of amino carboxylic acid and phosphorus sulfide-hydrocarbon reaction product.

References Cited in the file of this patent

UNITED STATES PATENTS

| | | |
| --- | --- | --- |
| 2,320,392 | White | June 1, 1943 |
| 2,546,552 | Loane et al. | Mar. 27, 1951 |
| 2,614,076 | Moore et al. | Oct. 14, 1952 |
| 2,680,094 | Bartlett et al. | June 1, 1954 |
| 2,749,311 | Sabol et al. | June 5, 1956 |
| 2,780,598 | Cafcas | Feb. 5, 1957 |
| 2,790,778 | Spivak et al. | Apr. 30, 1957 |

FOREIGN PATENTS

| | | |
| --- | --- | --- |
| 499,743 | Canada | Feb. 2, 1954 |